Figure 1:
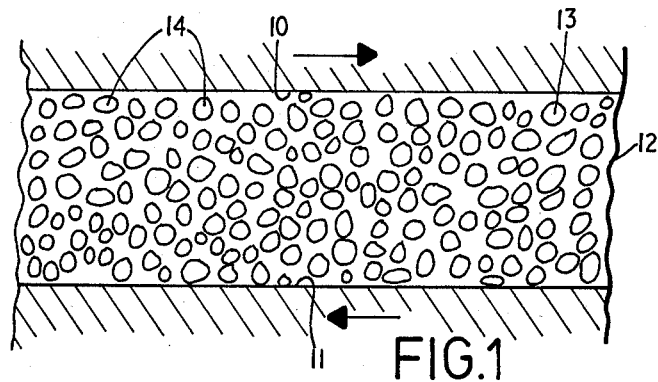

United States Patent [19]

Miller

[11] 4,111,498
[45] Sep. 5, 1978

[54] BEARINGS

[76] Inventor: Robert Eric Miller, 2 Ian Street, Rose Bay, New South Wales 2029, Australia

[21] Appl. No.: 670,783

[22] Filed: Mar. 26, 1976

[30] Foreign Application Priority Data

Apr. 2, 1975 [AU] Australia .............................. 1080/75

[51] Int. Cl.$^2$ ............................................ F16C 33/12
[52] U.S. Cl. ...................................... 308/5 R; 308/240
[58] Field of Search ............ 308/9, 5 R, 240, DIG. 8; 184/5; 188/269; 350/83

[56] References Cited

U.S. PATENT DOCUMENTS 2,416,504  2/1947  Trautman et al. ................... 252/49.6
3,603,664  9/1971  James ................................... 308/9 X
3,711,171  1/1973  Orkin et al. ........................... 308/241

Primary Examiner—Joseph F. Peters, Jr.
Assistant Examiner—Gene A. Church
Attorney, Agent, or Firm—Ladas, Parry, Von Gehr, Goldsmith & Deschamps

[57] ABSTRACT

The present invention relates to a bearing having at least two bearing surfaces provided with a clearance therebetween, the clearance being filled with a fluid mixture which provides a heavily damped viscous-drag on the bearing surfaces during slow relative movement of the surfaces and a substantially free-slipping movement of the surfaces upon a suddenly increased force being applied to the surfaces.

7 Claims, 3 Drawing Figures

U.S. Patent  Sept. 5, 1978  4,111,498

BEARINGS

The present invention relates to bearings and more particularly but not exclusively to a bearing for tilt and/or panning support heads for cameras, instruments or machines.

Conventionally such heads provide for tilting of the camera, that is rotation about an approximately horizontal axis and panning of the camera, that is rotation about an approximately vertical axis. It is important during tilting or panning that the movement of the camera should be fully controlled and smooth in order to prevent any undesirable irregular or jerky movements being reproduced by the camera.

Normally the moving parts of such supports are designed with a considerable degree of dampening, and this results in a significant torque being necessary to produce these movements. In certain instances it is desirable to be able to make a sudden and quick panning movement without detriment to the stability of movement during slow panning, where a well damped action is required. Such an operational characteristic is not obtainable with conventional fluid damped heads.

To date, the method of achieving such a sudden or quick movement, has been by use of a mechanical device for example a clutch or brake or the like which is placed above or below or in combination with a panning unit of the support head. Such additional devices increase the cost and weight of the support head and do not provide the smoothness of operation that may be attained with a conventional viscous-drag tilt or panning head.

An object of the present invention is to provide a device substantially free of the above disadvantages.

The present invention in one general form is a bearing having at least two surfaces which are movable with respect to each other, said surfaces having a fluid mixture therebetween, said fluid mixture comprising at least a suspension of particles of a first fluid in a second fluid, said first and said second fluids being immiscible.

In one preferred embodiment there is provided a conventional fluid drag tripod head having a panning unit comprising a piston located in a bore in a housing, the piston and bore being sized to provide a clearance therebetween and the piston being rotatable with respect to the housing, wherein the clearance is filled with the fluid mixture which provides for a heavily damped viscous-drag operation of the panning unit during slow panning movement and an almost free-slipping movement when the rotational torque applied to the pan unit is suddenly increased. The fluid mixture has the effect of again becoming highly viscous almost immediately upon reduction of the higher or suddenly applied rotational torque, thereby re-instating the initial desired viscous-drag for slow panning movement.

Figure 2:
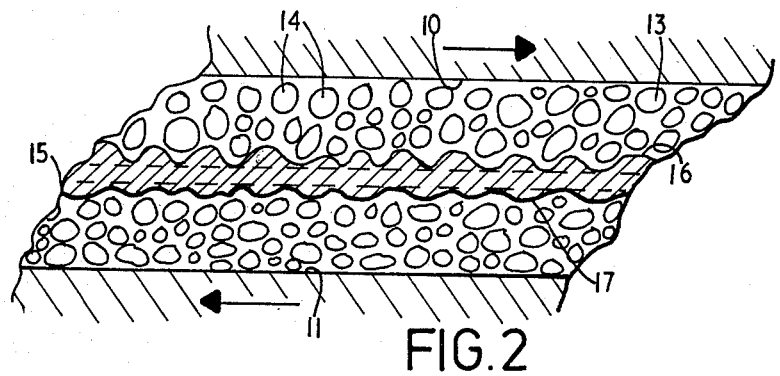
Figure 3:
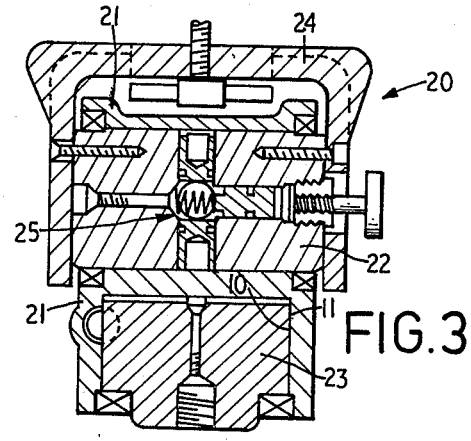

The quick or sudden bearing operation described above may be more readily understood by way of example, with reference to the accompanying drawings, in which:

FIG. 1 is a diagrammatic view of the fluid mixture when at rest or during slow relative movement of adjacent surfaces, FIG. 2 is a diagrammatic view of the fluid mixture illustrating an area of fluid rupture during a fast relative movement of adjacent surfaces, and FIG. 3 is a sectional arrangement of a camera tilt and panning head.

FIGS. 1 and 2 illustrate two relatively movable surfaces 10 and 11 of a bearing. Between the surfaces there is provided a thin fluid film of a mixture comprising a highly viscous, highly tacky base fluid 12 such as "polybutene", which is well known as a damping medium in dashpots and other devices, and a "silicone" fluid 13 of closely similar specific gravity. When such fluids are mixed, the "silicone" fluid forms and remains in a fine globular dispersion 14 throughout the base fluid 12, and the resulting mixture or emulsion may then be used as a viscous damping medium in, for example, a camera support tilt and panning unit of the type shown in FIG. 3 to provide the quick or sudden panning movement described above.

The camera support unit 20 of FIG. 3 comprises a casing 21, a tilt and panning block 22 and 23 respectively rotatably mounted in the casing 21 with their axes of rotation aligned perpendicularly to each other, a camera attachment plate 24, and a tilt block brake and locking mechanism 25. The support unit is mounted on a suitable tripod, pedestal or the like by securing the pan block 23 to the tripod. The relatively movable surfaces 10 and 11 identified in FIGS. 1 and 2 are those of the pan block 23 and its respective bore in casing 21. However, the present invention may be applied to the tilt bearing of the support unit 20 if required.

In such a tilt and panning unit 20 the fluid film is preferably of the order of one to 5 thousandth of an inch thick (0.001 to 0.005 inch) between the internal moving surfaces 10 and 11 thereof. When the fluid mixture is subjected to a mild shearing stress during slow relative movement of surfaces 10 and 11, i.e. during a slow panning movement, the fluid mixture exhibits a viscous-drag which is sufficient to produce slow, steady and jitter free panning of a camera.

However when the rotational torque, which is applied to produce the slow panning movement, is suddenly increased, as would be necessary when suddenly increasing panning speed, the fluid mixture will rupture (15) along a random line between the two relatively moving surfaces 10 and 11, as shown in FIG. 2. The surfaces 16 and 17 of the fluid mixture adjacent the rupture 15 effectively become the actual relative moving surfaces of the bearing. The silicone fluid, which was held in globular dispersion prior to the rupture and which lies in the path of the rupture, becomes at rupture, the viscous-drag fluid between the two surfaces 16 and 17 (and 10 and 11) and allows a quick and sudden slipping motion due to its differing drag characteristics, i.e. because of the difference in tackiness between selected polybutenes and silicones. When this quick relative movement of surfaces 10 and 11 ceases, the fluid rupture heals itself and the silicone particles again fall into free globular dispersion, and thus the fluid mixture regains its initial high viscous-drag that was apparent before the rupture formed.

The above described effect becomes more pronounced at temperatures approaching 10° C. below freezing, which is a further distinct advantage to photographers operating in such conditions, as most known types of heavily damped viscous-drag tripod heads tend to become almost impossible to operate at such temperatures without the additional mechanical devices or clutches. Also the drag characteristics of the silicone fluid are substantially unaffected by temperature.

It will be appreciated by one skilled in the art that the formulation of the fluid mixture may be varied to meet the mechanical requirements and constructional differences of different devices and to maintain the above described operational effect with those different devices.

As an example of a fluid mixture in accordance with the present invention, a mixture of approximately 50% by volume of each of the following two fluids below, when used in a camera panning unit at normal room temperature exhibits the above described slipping effect:

"Polybutene" viscosity — 100,000 centistokes specific gravity — 0.917
"Silicone" (dimethyl-polysiloxane) viscosity — 500,000 centistokes specific gravity — 0.978

It will be noted from the above example of the fluid mixture that the viscosity of the silicone fluid is high in comparison with that of polybutene. The viscosity of the silicone fluid also remains substantially stable with temperature over an expected working range, namely −10° C. to 45° C.

The viscosity of the polybutene on the other hand increases by a considerable amount at low working temperatures and makes the slipping effect more pronouned. At high working temperatures the viscosity of polybutene decreases to a limit where the slipping effect may become redundant.

It will be noted that the specific gravities quoted in the above example are substantially the same. Further, the silicone is oily and slippery to the touch whereas the polybutene is particularly tacky to the touch.

What I claim is:

1. A bearing having at least two bearing surfaces which are movable with respect to each other, said surfaces having a fluid mixture therebetween, said fluid mixture comprising at least a suspension of particles of a first fluid in a second fluid, said first and said second fluids being immiscible, said first fluid being a lubricant and said second fluid being highly viscous.

2. A bearing as claimed in claim 1 wherein the specific gravities of said first and said second fluids are substantially the same.

3. A bearing as claimed in claim 1 wherein said mixture comprises substantially equal parts by volume of said first and said second fluids, said first fluid being a silicone liquid exhibiting a viscosity of approximately 500,000 centistokes and a specific gravity of approximately 0.978, said second fluid being a polybutene liquid exhibiting a viscosity of approximately 100,000 centistokes and a specific gravity of approximately 0.917.

4. A camera support head having a bearing as claimed in claim 1.

5. A support head for pivotally mounting an apparatus thereon, said support head comprising at least one casing having a bore therein, a block rotatably mounted with a neat fit within said bore, apparatus support means attached either to said casing or to said block, a fluid mixture between adjacent surfaces of said block and said bore, sealing means to maintain said fluid mixture between said surfaces, said fluid mixture characterized by a suspension of a first immiscible lubricating fluid in a second immiscible fluid, said second immiscible fluid being highly viscous and tacky.

6. A support head as claimed in claim 5 wherein the specific gravities of said first and said second fluids are substantially the same.

7. A support head as claimed in claim 5 wherein said fluid mixture comprises substantially equal parts by volume of said first and said second fluids, said first fluid being a silicone liquid exhibiting a viscosity of approximately 500,000 centistokes and a specific gravity of approximately 0.978, said second fluid being a polybutene liquid exhibiting a viscosity of approximately 100,000 centistokes and a specific gravity of approximately 0.917.

* * * * *